United States Patent
Harris et al.

(10) Patent No.: US 11,032,040 B2
(45) Date of Patent: Jun. 8, 2021

(54) METHODS AND APPARATUSES FOR PERFORMING UPLINK COORDINATED MULTI-POINT COMMUNICATION

(71) Applicant: NOKIA SOLUTIONS AND NETWORKS OY, Espoo (FI)

(72) Inventors: John Harris, Whitefish Bay, WI (US); Roy Yang, Buffalo Grove, IL (US); Deepak Pengoria, Uttar Pradesh (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/308,879

(22) PCT Filed: Jun. 8, 2017

(86) PCT No.: PCT/EP2017/063991
§ 371 (c)(1),
(2) Date: Dec. 11, 2018

(87) PCT Pub. No.: WO2017/216036
PCT Pub. Date: Dec. 21, 2017

(65) Prior Publication Data
US 2019/0229865 A1  Jul. 25, 2019

(30) Foreign Application Priority Data
Jun. 15, 2016  (IN) .............................. 201611020404

(51) Int. Cl.
*H04B 7/024*  (2017.01)
*H04L 5/00*  (2006.01)
(Continued)

(52) U.S. Cl.
CPC ........... *H04L 5/0035* (2013.01); *H04B 7/024* (2013.01); *H04L 1/1812* (2013.01); *H04W 72/0413* (2013.01)

(58) Field of Classification Search
None
See application file for complete search history.

(56) References Cited

U.S. PATENT DOCUMENTS 7,454,457 B1 *  11/2008  Lowery ............... H04L 43/0852
709/203
2012/0184218 A1  7/2012  Boudreau et al.
(Continued)

OTHER PUBLICATIONS

Nagaraj Shirish et al: "Distributed uplink CoMP for small-cell networks," 2015 49th Asilomar Conference on Signals, System and Computers, IEEE, Nov. 8, 2015, pp. 1420-1424.
(Continued)

*Primary Examiner* — Jenkey Van
(74) *Attorney, Agent, or Firm* — Squire Patton Boggs (US) LLP (57) ABSTRACT

Systems, methods, apparatuses, and computer program products for utilizing uplink (UL) CoMP helper data are provided. One method includes setting, by a network node serving a user equipment, a priority for a helper data request of an uplink transmission of the user equipment. The setting may include setting the priority based on a specific history of the user equipment. The method may also include sending the helper data request to another network node and, optionally, sending the priority set for the helper data request to said another network node.

14 Claims, 4 Drawing Sheets

(51) Int. Cl.
*H04L 1/18* (2006.01)
*H04W 72/04* (2009.01)

(56) References Cited

U.S. PATENT DOCUMENTS

| | | | | |
|---|---|---|---|---|
| 2013/0055275 | A1* | 2/2013 | Comeau | H04W 72/1257 718/103 |
| 2014/0003345 | A1* | 1/2014 | Chu | H04L 1/0026 370/328 |
| 2014/0051471 | A1* | 2/2014 | Comeau | H04B 7/024 455/509 |
| 2014/0293889 | A1* | 10/2014 | Mahr | H04L 1/1825 370/329 |
| 2016/0007337 | A1* | 1/2016 | Hessler | H04L 5/006 370/230 |
| 2019/0116608 | A1* | 4/2019 | Kim | H04W 72/1263 |

OTHER PUBLICATIONS

International Search Report & Written Opinion dated Sep. 5, 2017 corresponding to International Patent Application No. PCT/EP2017/063991.
First Office Action issued in corresponding Chinese Patent Application No. 201780037385.0 dated Oct. 9, 2020, with English summary thereof.

* cited by examiner

METHODS AND APPARATUSES FOR PERFORMING UPLINK COORDINATED MULTI-POINT COMMUNICATION

BACKGROUND

Field

Certain embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), and/or 5G radio access technology. Some embodiments may relate to methods and apparatuses for mitigating aliasing in a digital pre-distortion (DPD) system of base stations (e.g., BTS, node B, eNB) in such communications networks.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

Coordinated multi-point transmission/reception (CoMP) includes techniques for LTE-Advanced systems to increase the cell average and cell edge user throughput in both uplink and downlink. LTE CoMP is essentially a range of different techniques that enable the dynamic coordination of transmission and reception over a variety of different base stations. The aim is to improve overall quality for the user as well as improving the utilization of the network. LTE-Advanced CoMP can turn the inter-cell interference (ICI) into a useful signal, especially at the cell borders where performance may be degraded.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method that may include setting, by a network node serving a user equipment, a priority for at least one helper data request of an uplink transmission of the user equipment. The setting may include setting the priority based on a specific history of the user equipment. The method may also include sending the at least one helper data request to another network node and, optionally, sending the priority set for the helper data request to said another network node.

Another embodiment is directed to an apparatus including setting means for setting a priority for at least one helper data request of an uplink transmission from a user equipment. The setting means may include means for setting the priority based on a specific history of the user equipment. The apparatus may also include sending means for sending the at least one helper data request to a network node and, optionally, sending means for sending the priority set for the helper data request to said another network node.

Another embodiment is directed to a method that may include receiving, by a network node, an uplink transmission from at least one user equipment. The method may also include receiving, from another network node, one or more coordinated multipoint transmission helper data requests for the at least one user equipment, and selecting which of the coordinated multipoint transmission helper data requests for the at least one user equipment to satisfy based on a priority set by said another network node for the helper data request of the uplink transmission. The priority for the helper data request of the uplink transmission may be set based on a specific history of the at least one user equipment.

Another embodiment is directed to an apparatus including receiving means for receiving an uplink transmission from at least one user equipment, receiving means for receiving, from another network node, one or more coordinated multipoint transmission helper data requests for the at least one user equipment, and selecting means for selecting which of the coordinated multipoint transmission helper data requests for the at least one user equipment to satisfy based on a priority set by said another network node for the helper data request of the uplink transmission. The priority for the helper data request of the uplink transmission may be set based on a specific history of the at least one user equipment.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for utilizing uplink (UL) CoMP helper data, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are directed to improving uplink radio frequency (RF) capacity and coverage by utilizing UL COMP between cells. In the past, there have been certain commercial solutions, such as within stadium environments which utilize special cabling. However, for example in deployments outside of stadiums, network operators may have 3 to 4 ms latency from the antenna site to the central office. In the context of systems with helper data delays among cells, certain embodiments address the requesting and utilization of UL CoMP helper data, while providing for special treatment on the final configured (e.g., 4th) hybrid automatic repeat request (HARQ) attempt. The final configured HARQ attempts refers to the final of HARQ attempt at which point the maximum number of HARQ attempts has been reached, where this maximum has been, for instance configured by the (LTE) air interface signaling, e.g., using variants of RRC and/or MAC signaling. This is because this helper data then arrives too late to provide an accurate Physical HARQ Indicator Channel (PHICH), and the UE needs accurate PHICH to avoid confusing the UE triggering of radio link control (RLC) on the final configured (e.g., 4th) HARQ attempt. In addition, certain embodiments provide a mechanism for avoiding service degradation associated with intermittent use of UL CoMP.

If the UL CoMP/interference rejection combining (IRC) helper data encounters multi transmission time interval (TTI) delays, then the server cannot use helper data for the final configured (e.g., 4th) HARQ attempt. This is because, as mentioned, the helper data would have arrived too late to provide an accurate PHICH, and the UE needs accurate PHICH to avoid confusing the UE triggering of RLC on the final HARQ attempt.

For a given UE, if UL CoMP was in use, but now it has been turned off (e.g., helper data will no longer be retrieved), then that may cause the very next HARQ to fail entirely, e.g., after the final configured/four attempts. This may be a particularly significant problem for voice data if UL CoMP were to repeatedly turn on and then off (in a voice call).

In view of the above, some embodiments of the invention aim to provide a UL CoMP solution which can work across a range of delays. This can enable UL CoMP to expand beyond stadiums to include benefits in dense urban areas. Some embodiments have the benefits of working across both macro and small cells. Some embodiments may also opportunistically leverage low latency interconnects, e.g., among small cells or across serial rapid input-output (SRIO) switching functionality where available. In many situations there are still expected to be significant scenarios where multi-TTI delays will be encountered, such that the techniques provided by some embodiments of the invention will be needed and helpful.

As introduced above, some embodiments of the invention include the requesting and utilization of UL COMP helper data, while providing for special treatment on the final configured (e.g. 4th) HARQ attempt. In addition, certain embodiments may provide a mechanism for avoiding service degradation associated with intermittent use of UL CoMP. Further, an embodiment proposes a mechanism for utilizing the UE specific history, where this history includes, for example, whether that UE has already been using UL CoMP and/or whether that UE has already completed all but one of the maximum number of configured HARQ attempts within this particular HARQ process.

According to certain embodiments, a helper data request may refer to a request sent by a first cell or eNB and received by a second cell or eNB. For example, the helper request or helper data request may be a request from one cell to ask another cell to share what it received while it was also listening to a particular UE or physical resource block (PRB). In certain embodiments, as used herein, when it is stated that a helper request is "for" a particular UE, it means that the helper request corresponds to a cell listening where that particular UE was transmitting on the uplink (UL) area.

An embodiment is directed to a process for setting priority for helper data (or helper/assistance request) based on the used number of HARQ requests for a particular UE. For example, in one embodiment, the priority for helper data is set such that the priority is low for the final (e.g., $4^{th}$) HARQ requests and the priority is higher for other than the final (e.g., $4^{th}$) HARQ requests and/or UEs which have previously received the benefit of UL CoMP.

In certain embodiments, the priority for the helper data may be set as a numerical value. For example, in one embodiment, the priority may be set to be a numerical value between 0 and 10, where 0 is the lowest priority and 10 is the highest priority. In an example embodiment, the numerical values of 0, 1, 2, 3, and 4 may be considered "lower" priority values, while numerical values 6, 7, 8, 9, 10 may be considered "higher" priority values. Thus, according to this example and in one embodiment, as discussed herein, setting the priority to the lowest value may mean setting the priority to 0, while setting the priority to the highest value may be mean setting the priority to 10. It is noted that this is only one example of the priority values that can be used, and other possibilities are also applicable.

In one embodiment, the priority for requesting helper data for the final configured HARQ attempt may be set to the lowest value, such as zero, for example. By setting the priority for the final HARQ attempt to the lowest value (e.g., zero), some embodiments are able to prevent the case where the helper data arrives too late to be useful, without causing the RLC state and the network and the UE to have two different understandings as to whether the overall HARQ process was successful, e.g., considering the case where there are multiple/subsequent RLC attempts. In other words, in a system where helper data encounters multiple milliseconds of delay, that helper data will arrive too late to be useful without causing the RLC state and the network and the UE to have two different understandings as to whether the overall HARQ process was successful. Furthermore, by avoiding requesting helper data within such a system on the final HARQ attempt, certain embodiments can avoid having the helper data arrive at all. As a result, in this case, the helper data will not arrive at all, so it will not arrive at a time when it is too late for to be useful.

It is noted that the priority for the helper data can be a function of the signal-to-interference-plus-noise-ratio (SINR) at the neighboring helper cell(s) and the SINR at the serving cell relative to the neighboring helper cells. In one embodiment, if there are two different UEs that have identical SINR at the serving and helper cells, then the UE which had previously been benefiting from UL comp/helper data would receive higher priority (for a helper data request) than the other UE which had not—such that if only one of the two UEs can benefit from UL CoMP, then the higher priority UE will receive the ULCoMP benefit.

According to one embodiment, where N is the amount that the neighbor cell's SINR is below the SINR of the local/serving cell and A is the absolute SINR of the neighbor cell, then the higher N is above some threshold, e.g. 20, and the higher A is than some threshold, e.g. −10 dB, then that UE is a candidate for utilizing UL CoMP. Furthermore, if the values of A or N for that UE are even larger, then that UE can be given even higher priority for utilizing UL CoMP. In some example cases, there may not be enough processing or intercell communication bandwidth to support UL CoMP for all of the UEs which satisfy this threshold requirement. It is from this perspective, that UEs with higher values of A or N may have a higher priority for utilizing UL CoMP/helper data. In other words, the priority function increases (i.e., provides higher priority) when A increases and when N increases. For example, when there is a finite amount of bandwidth to exchange helper data with neighboring cells, the process begins with the higher priority UEs according to the above and requests helper data for as many as possible higher priority UEs, until the process reaches the interconnect bandwidth limitation.

In one embodiment, after the interconnect bandwidth and/or processing bandwidth available is completely allocated to the higher priority UEs, the remaining lower priority UEs will not utilize UL CoMP; for example, the remaining lower priority UEs may utilize antenna data only from their local cell, and not utilize antenna data from other cell sites. The interconnect bandwidth refers to the ability to convey antenna data from one cell site to another. The processing bandwidth may refer to the ability for one or more cell sites to process and/or store additional antenna data.

In some embodiments, the UL CoMP selection process (which selects which UE's use UL CoMP, and for which neighbors) can further achieve the described priority adjustment through: (1) if the UE has previously benefited from UL CoMP, then the UL CoMP helper selection process will add an additional offset, e.g. 3 dB to N and A for that UE; and (2) if the UE has not previously benefited from UL CoMP, then the UL CoMP helper selection process will subtract an additional offset, e.g. 3 dB from both N and A for that UE.

According to an embodiment, the UL CoMP helper selection process can achieve the priority adjustment on the final configured HARQ attempt through the following. If the UE is on the final configured HARQ attempt, then the UL CoMP helper selection mechanism subtracts a very large offset, e.g. 50 dB from both N and A for that UE.

Figure 1A:
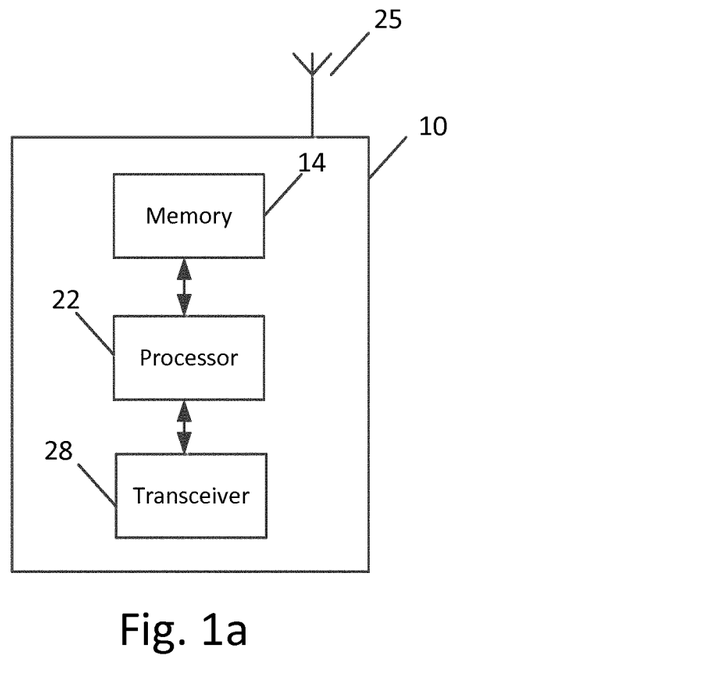
FIG. 1a illustrates a block diagram of an apparatus, according to one embodiment.

FIG. 1a illustrates an example of an apparatus 10 according to one embodiment. In an embodiment, apparatus 10 may be a node, host, or server in a communications network or serving such a network. For example, apparatus 10 may be a network node or access node for a radio access network, such as a base station, node B or eNB, or an access node of 5G radio access technology. It should be noted that one of ordinary skill in the art would understand that apparatus 10 may include components or features not shown in FIG. 1a.

As illustrated in FIG. 1a, apparatus 10 may include a processor 22 for processing information and executing instructions or operations. Processor 22 may be any type of general or specific purpose processor. While a single processor 22 is shown in FIG. 1a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B, or eNB, or an access node of 5G, for example. In one embodiment, apparatus 10 may be a target base station or eNB, for example. According to one embodiment, apparatus 10 may be controlled by memory 14 and processor 22 to receive an UL communication or data transmission from one or more UEs, and to receive at least one UL CoMP helper data request for the one or more UEs. In an embodiment, the at least one UL CoMP helper data request may be received from another base station, eNB, or cell. For example, in certain embodiments, the UL CoMP helper data request may have been sent by the serving cell (e.g., the eNB serving the one or more UEs) and received by apparatus 10. In an embodiment, apparatus 10 may then be controlled by memory 14 and processor 22 to select which of the at least one UL CoMP helper data request to satisfy based on a priority set for the helper data request of the UL communication or data transmission. In an embodiment, the priority is set dependent upon a specific history of the one or more UEs.

In some embodiments, apparatus 10 may be further controlled by memory 14 and processor 22 to provide helper data for the UE depending on the priority that is set for the helper data request. For example, in one embodiment, apparatus 10 may be controlled by memory 14 and processor 22 to provide, to the requesting or serving cell, helper data for the highest priority user equipment until an interconnect bandwidth limitation is reached.

Figure 1B:
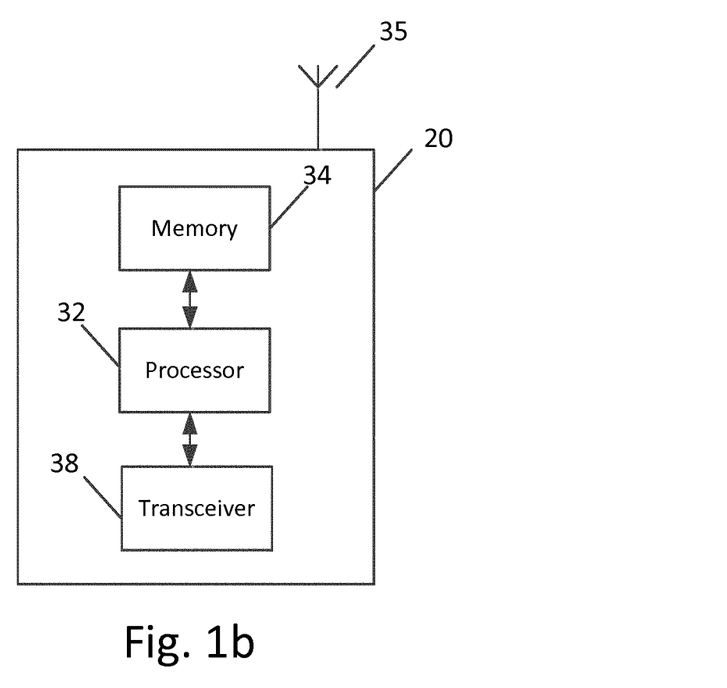
FIG. 1b illustrates a block diagram of an apparatus, according to another embodiment.

FIG. 1b illustrates an example of an apparatus 20 according to another embodiment. In an embodiment, apparatus 20 may be may be a node, host, or server in a communications network or serving such a network. For example, apparatus 20 may be a network node or access node for a radio access network, such as a base station, node B or eNB, or an access node of 5G radio access technology. In one embodiment, apparatus 20 may be the node sending the helper data request to another cell or eNB, as discussed above. It should be noted that one of ordinary skill in the art would understand that apparatus 20 may include components or features not shown in FIG. 1b.

As illustrated in FIG. 1b, apparatus 20 may include a processor 32 for processing information and executing instructions or operations. Processor 32 may be any type of general or specific purpose processor. While a single processor 32 is shown in FIG. 1b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a network node or access node, such as a base station, node B, or eNB, or an access node of 5G, for example. In one embodiment, apparatus 20 may be a serving base station, serving eNB, or serving cell for example. In this embodiment, apparatus 20 may be controlled by memory 34 and processor 32 to perform the functions associated with embodiments described herein. In one embodiment, apparatus 20 may be controlled by memory 34 and processor 32 to set a priority for a helper data request of an UL communication or data transmission based on a specific history of the UE transmitting the UL communication or data transmission. In one embodiment, apparatus 20 may then be controlled by memory 34 and processor 32 to send the helper data request and, optionally, to send the priority of the helper data request to another apparatus (e.g. eNB).

In one embodiment, for example, when the helper data request is for a received communication or data transmission from a UE having the final configured HARQ attempt and there are multi-TTI delays (e.g., if the helper data for the final HARQ attempt will not arrive within 100 µs then do not request it/set the priority to "zero"), apparatus 20 may be controlled by memory 34 and processor 32 to set a lower priority (or "zero" priority) for the helper data request(s).

In one embodiment, for example, when it is a helper data request for a UE which has not previously received the benefit of UL CoMP (e.g., users not previously using UL CoMP are lower priority targets for beginning to use UL comp, especially if they are delay sensitive, such as voice services), apparatus 20 may be controlled by memory 34 and processor 32 to set a lower priority (or "zero" priority) for the helper data request(s).

When the helper data request is for a UE which has previously received the benefit of UL CoMP and there is a delay sensitive service (e.g., within the voice category), when the helper data request is not for the final configured HARQ attempt and there are multi-TTI delays, apparatus 20 may be controlled by memory 34 and processor 32 to set a higher priority for the helper data request(s).

When the helper data request is for the final configured HARQ attempt and sub TTI delays are possible (e.g., with a higher priority helper data delays of 100 µs are possible), apparatus 20 may be controlled by memory 34 and processor 32 to set a higher priority for the helper data request(s). Thus, according to an embodiment, UE(s) which are already using UL CoMP may be provided a higher priority with respect to using UL CoMP during the next upcoming time interval.

In an embodiment, apparatus 20 may be controlled by memory 34 and processor 32 to set the lower priority for the helper data request to zero. In one embodiment, if there is some nonzero probability (e.g., 10%) that the helper data will arrive within the threshold time interval (e.g., 100 µs), then the UL comp priority may be set to a low value (e.g., 1) which is still greater than zero (such that this UL CoMP request is only sent if there is still UL CoMP bandwidth after all of the other UEs with nonzero UL CoMP priority have allocated UL comp resources). Similarly, in an embodiment, if this probability is incrementally larger (e.g., 20%), then the UL comp priority may be set to a modestly higher value (e.g., 2) such that this UL CoMP request is only sent if there is still UL CoMP bandwidth available for UL CoMP after all other UEs with priority greater than two have been allocated UL CoMP resources. For instance, in one embodiment, when the helper data for the final HARQ attempt will not arrive within a threshold interval, (where the threshold is, for example, 100 µs, but it may also have other similar values, e.g. between 50 and 200 µs), apparatus 20 may be controlled by memory 34 and processor 32 to set the priority of the helper data request to zero.

It is noted that, according to certain embodiments, the priority for the helper data request is a function of SINR at neighboring cells and the SINR at the serving cell relative to the neighboring cells. In an embodiment, where N is the amount that the SINR of the neighbor cell is below the SINR of the serving cell and A is the absolute SINR of the neighbor cell, and apparatus 20 may be controlled by memory 34 and processor 32 to increase the priority of the helper data request as N increases and as A increases.

Figure 2A:
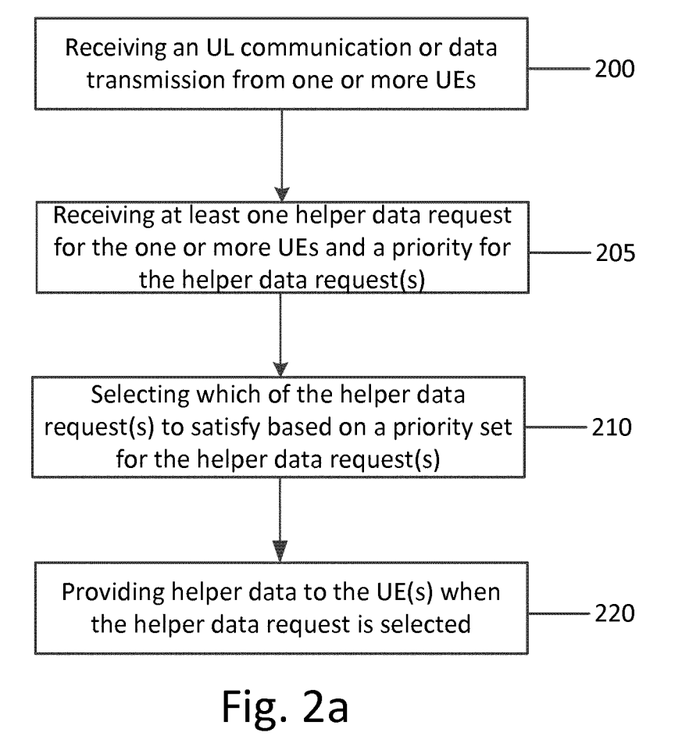
FIG. 2a illustrates a flow diagram of a method, according to an embodiment.

FIG. 2a illustrates an example flow diagram of a method for controlling a request for post-FFT (fast Fourier transform) helper data, according to one embodiment. In an embodiment, the method of FIG. 2a may be performed by a network node, such as a base station, access point, node B, eNB, or an access node of 5G radio access technology. According to one embodiment, the method may include, at 200, receiving an UL communication or data transmission from one or more UEs and, at 205, receiving at least one helper data request for the one or more UEs. The method may then include, at 210, selecting which of the at least one UL CoMP helper data request to satisfy based on a priority set for the helper data request of the UL communication or data transmission. In an embodiment, the priority is set dependent upon a specific history of the one or more UEs. In an embodiment, the method may further include, at 220, providing (to the requesting cell or access node e.g. eNB) helper data for the UE depending on the priority that is set for the helper data request or when the priority set for the UE dictates that the helper data should be provided. For example, in an embodiment, the providing may further include providing helper data for each of the highest priority user equipment until the interconnect bandwidth limitation is reached.

Figure 2B:
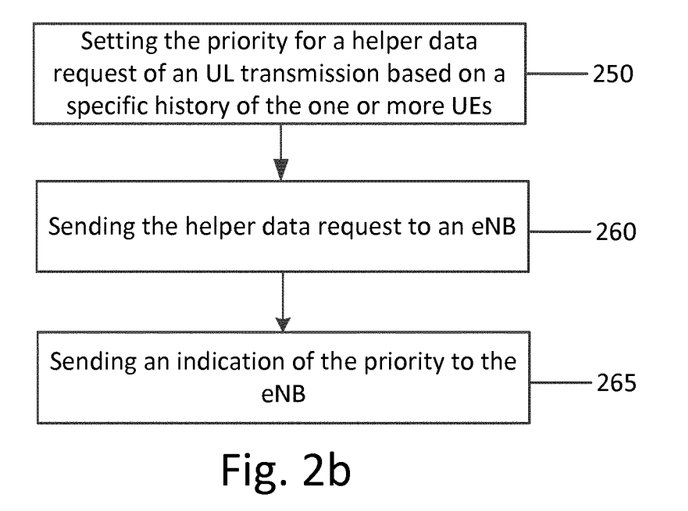
FIG. 2b illustrates a flow diagram of a method, according to another embodiment.

FIG. 2b illustrates an example flow diagram of a method for setting a priority for a request for helper data, according to one embodiment. In an embodiment, the method of FIG. 2b may be performed by a cell or a network node, such as a base station, access point, node B, eNB, or an access node of 5G radio access technology. For instance, according to an embodiment, the method of FIG. 2b may be performed by a serving eNB or cell.

According to one embodiment, the method of FIG. 2b may include, at 250, setting a priority for a helper data request of an UL communication or data transmission based on a specific history of the UE transmitting the UL communication or data transmission. In one embodiment, the method may also include, at 260, sending the helper data request to another cell or network node (e.g. eNB). According to an embodiment, the method may also include, at 265, sending the priority of the helper data request to another cell or network node (e.g. eNB).

For example, in one embodiment, the setting of the priority 250 may further include setting the priority for the helper data request such that a lower (or "zero") priority when the helper data request is for the final configured HARQ attempt and there are multi-TTI delays (e.g., if the helper data for the final HARQ attempt will not arrive within 100 µs then do not request it/set the priority to "zero"), and/or when it is a helper data request for a UE which has not previously received the benefit of UL CoMP (e.g., users not previously using UL CoMP are lower priority targets for beginning to use UL comp, especially if they are delay sensitive, such as voice services).

Additionally or alternatively, the setting of the priority 250 may further include setting the priority for helper data requests such that a higher priority is provided when the helper data request is at least one of:

for a UE which has previously received the benefit of UL CoMP and there is a delay sensitive service (e.g., within the voice category), not for the final configured HARQ attempt and there are multi-TTI delays, and/or for the final configured HARQ attempt and sub TTI delays are possible (e.g., with a higher priority helper data delays of 100 is are possible).

Thus, according to an embodiment, UEs which are already using UL CoMP may be provided a higher priority with respect to using UL CoMP during the next upcoming time interval.

Figure 3:
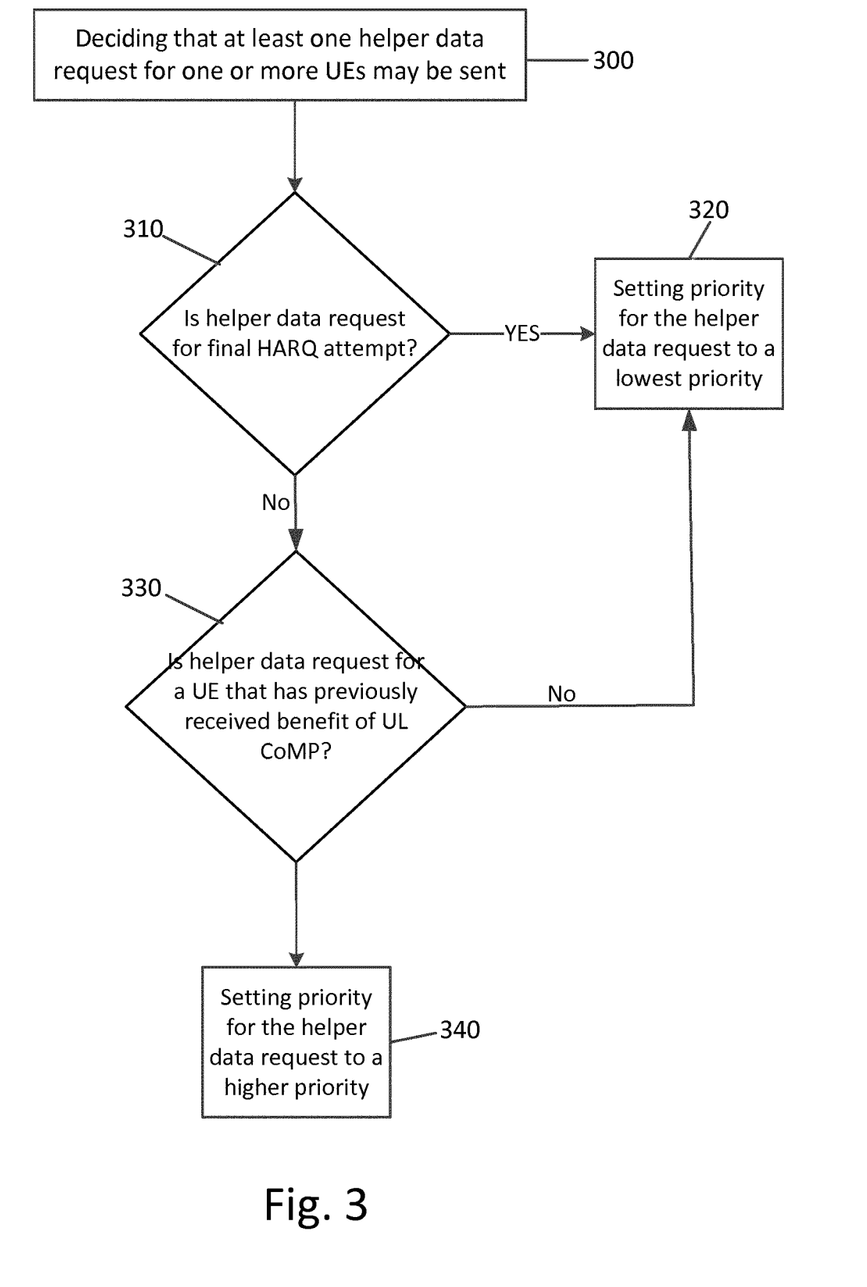
FIG. 3 illustrates a flow diagram of a method, according to another embodiment.

FIG. 3 illustrates another example flow diagram of a method for setting a priority for a request for post-FFT (fast fourier transform) helper data, according to a further embodiment. In an embodiment, the method of FIG. 3 may be performed by a network node, such as a base station, access point, node B, eNB, or an access node of 5G radio access technology. It is noted that, in certain embodiments, the method illustrated in FIG. 3 may be combined with the methods illustrated in FIG. 2a or 2b, or each of the illustrated methods may be used individually or as alternatives. For example, in one embodiment, the step of setting the priority 250 in FIG. 2b may be performed, in part, according to the flow chart depicted in FIG. 3.

The method of FIG. 3 may include, at 300, deciding that at least one UL CoMP helper data request for one or more UEs may be sent. The method may then include, at 310, determining whether the at least one helper data request is for a final configured HARQ attempt. If the at least one helper data request is for a final configured HARQ attempt, then the method may include, at 320, setting the priority for the at least one helper data request to be a lower (for example "zero") priority. If the at least one helper data request is not for a final configured HARQ attempt, then the method may include, at 330, determining whether the helper data request is for a UE that has previously received the benefit of UL CoMP. If it is determined that the helper data request is not for a UE that has previously received the benefit of UL CoMP, then the method may proceed, at 320, to setting the priority for the at least one helper data request to be a lower (for example "zero") priority. If it is determined that the helper data request is for a UE that has previously received the benefit of UL CoMP, then the method may include, at 340, setting the priority for the at least one helper data request to have a higher priority. For example, the higher priority that is set for a helper data request may mean that a UE which has previously utilized UL CoMP may continue to utilize UL CoMP with the same priority as if it had SINR values as would have been the case if its priority was unchanged and its values of A and N (as previously defined) were each 3 dB higher.

Therefore, embodiments of the invention provide several advantages and/or technical improvements. For example, the use of some embodiments of the invention can result in improved uplink capacity and/or coverage by utilizing UL CoMP between cells, thereby improving the functioning of communications networks and their nodes.

Figure 4:
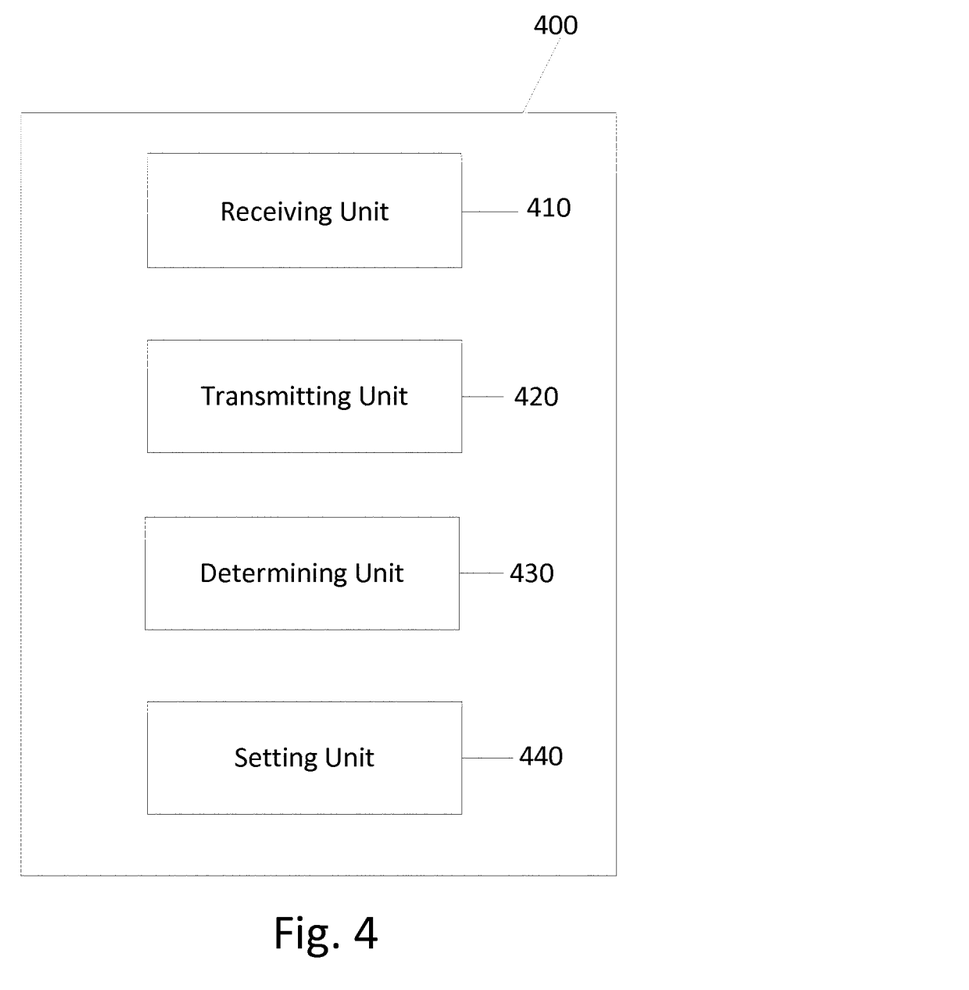
FIG. 4 illustrates a block diagram of an apparatus, according to another embodiment.

FIG. 4 illustrates a block diagram of an apparatus 400, according to another embodiment. As illustrated in FIG. 4, apparatus 400 may include a receiving unit or means 410, a transmitting unit or means 420, a determining unit or means 430, and a setting unit or means 440.

In one embodiment, receiving unit 410 may be caused to receive an UL communication or data transmission from one or more UEs and to receive at least one helper data request for the one or more UEs. The determining unit 430 may be caused to select which of the helper data request(s) to satisfy based on a priority set for the helper data request of the UL communication or data transmission. In an embodiment, the priority is set dependent upon a specific history of the one or more UEs. In an embodiment, the transmitting unit 420 may be caused to provide or transmit, to a requesting or serving eNB, helper data for the user equipment depending on the priority that is set for the helper data request. For example, in an embodiment, the transmitting unit 420 may be caused to provide helper data for each of the highest priority user equipment until the interconnect bandwidth limitation is reached.

In another embodiment, the setting unit 440 may be caused to set the priority for the helper data request based on a specific history of the UE transmitting the UL communication or data transmission. In one embodiment, the transmitting unit 420 may be caused to send the helper data request. In one embodiment, the transmitting unit 420 may be caused to send the priority of the helper data request to another apparatus (e.g. eNB). For example, in one embodiment, the setting unit 440 may be further caused to set the priority for the helper data request such that a lower (or "zero") priority is provided when the helper data request is for the final configured HARQ attempt and there are multi-TTI delays (e.g., if the helper data for the final HARQ attempt will not arrive within 100 μs then do not request it/set the priority to "zero"), and/or when it is a helper data request for a UE which has not previously received the benefit of UL CoMP (e.g., users not previously using UL CoMP are lower priority targets for beginning to use UL comp, especially if they are delay sensitive, such as voice services).

Additionally or alternatively, the setting unit 440 may be further caused to set the priority for helper data requests such that a higher priority is provided when the helper data request is for a UE which has previously received the benefit of UL CoMP and there is a delay sensitive service (e.g., within the voice category), when the helper data request is not for the final configured HARQ attempt and there are multi-TTI delays, and/or when the helper data request is for the final configured HARQ attempt and sub TTI delays are possible (e.g., with a higher priority helper data delays of 100 μs are possible). Thus, according to an embodiment, setting unit 440 may be caused to provide UEs which are already using UL CoMP with a higher priority with respect to using UL CoMP during the next upcoming time interval.

In some embodiments, the functionality of any of the methods, processes, or flow charts described herein may be implemented by software and/or computer program code or portions of it stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out certain embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   setting, by a network node serving a user equipment, a priority for at least one helper data request of an uplink transmission of the user equipment, wherein the setting comprises setting the priority based on a specific history of the user equipment; and
   sending the at least one helper data request to another network node,
   wherein the setting further comprises setting the priority to a value representing a lower priority for the helper data request of the uplink transmission when the user equipment has not previously received the benefit of uplink Coordinated Multipoint Transmission.

2. The method according to claim 1, wherein the sending comprises sending the at least one helper data request to said another network node based on the priority set for the at least one helper data request.

3. The method according to claim 1, further comprising sending the priority of the helper data request to said another network node.

4. The method according to claim 1, wherein the lower priority set for the helper data request is a lowest value of priority.

5. The method according to claim 1, wherein, when the helper data for a final hybrid automatic repeat request attempt will not arrive within 100 μs, the setting comprises setting the priority of the helper data request to a value of zero.

6. The method according to claim 1, wherein the network node comprises at least one of a base station, access point, or evolved node B serving a cell of the communications system.

7. The method according to claim 6, wherein the priority for the helper data request is a function of signal-to-interference-plus-noise-ratio at neighboring cells and the signal-to-interference-plus-noise-ratio at the serving cell relative to the neighboring cells.

8. The method according to claim 7, wherein N is the amount that the signal-to-interference-plus-noise-ratio of the neighbor cell is below the SINR of the serving cell and A is the absolute signal-to-interference-plus-noise-ratio of the neighbor cell, and the method further comprises increasing the priority of the helper data request as N increases and as A increases.

9. A non-transitory computer-readable medium encoded with instructions that, when executed by a computer, cause performance of a method according to claim 1.

10. A method, comprising:
    setting, by a network node serving a user equipment, a priority for at least one helper data request of an uplink transmission of the user equipment, wherein the setting comprises setting the priority based on a specific history of the user equipment; and
    sending the at least one helper data request to another network node, wherein the setting comprises setting the priority to a value representing a higher priority for the helper data request of the uplink transmission when at least one of: the user equipment has previously received the benefit of uplink Coordinated Multipoint Transmission, or the uplink transmission is not for a final configured hybrid automatic repeat request attempt and there are multi transmission time interval delays.

11. A non-transitory computer-readable medium encoded with instructions that, when executed by a computer, cause performance of a method according to claim 10.

12. An apparatus, comprising:
    at least one processor; and
    at least one memory including computer program code,
    wherein the at least one memory and computer program code are configured, with the at least one processor, to cause the apparatus implement a process comprising
    setting a priority for at least one helper data request of an uplink transmission from a user equipment, wherein the priority is set based on a specific history of the user equipment; and
    sending the at least one helper data request to a network node,
    wherein the setting further comprises setting the priority to a value representing a lower priority for the helper data request of the uplink transmission when the user equipment has not previously received the benefit of uplink Coordinated Multipoint Transmission.

13. The apparatus according to claim 12, wherein the lower priority set for the helper data request is a lowest value of priority.

14. The apparatus according to claim 12, wherein, when the helper data for a final hybrid automatic repeat request attempt will not arrive within 100 µs, the setting comprises setting the priority of the helper data request to a value of zero.

\* \* \* \* \*